(12) United States Patent
Jiorle

(10) Patent No.: US 7,743,520 B1
(45) Date of Patent: Jun. 29, 2010

(54) DIGITAL LEVEL DETECTOR APPARATUS CONVERTIBLE FOR REMOTE SENSING

(76) Inventor: Michael A. Jiorle, 4291 N. Delaware Dr., Easton, PA (US) 18040

( * ) Notice: Subject to any disclaimer, the term of this patent is extended or adjusted under 35 U.S.C. 154(b) by 37 days.

(21) Appl. No.: 12/274,073

(22) Filed: Nov. 19, 2008

Related U.S. Application Data

(60) Provisional application No. 60/989,066, filed on Nov. 19, 2007.

(51) Int. Cl.
*G01C 9/06* (2006.01)
(52) U.S. Cl. .................. 33/366.11; 33/366.25
(58) Field of Classification Search ............ 33/366.14, 33/366.11, 366.25
See application file for complete search history.

(56) References Cited

U.S. PATENT DOCUMENTS

| | | | | |
|---|---|---|---|---|
| 3,233,235 A | * | 2/1966 | Wright | 33/366.24 |
| 3,324,564 A | * | 6/1967 | Wright et al. | 33/366.16 |
| 3,657,551 A | * | 4/1972 | Lingert et al. | 250/206.1 |
| 4,154,000 A | * | 5/1979 | Kramer | 33/366.14 |
| 4,467,527 A | * | 8/1984 | North et al. | 33/366.14 |
| 4,625,423 A | * | 12/1986 | Sackett | 33/366.16 |
| 4,658,508 A | * | 4/1987 | Oberg | 340/440 |
| 5,136,784 A | * | 8/1992 | Marantz | 33/366.24 |
| 5,784,794 A | * | 7/1998 | Nelson | 33/366.14 |
| 6,526,668 B1 | * | 3/2003 | Beckhart et al. | 33/366.11 |
| 6,836,972 B2 | * | 1/2005 | Drahos et al. | 33/366.11 |
| 6,981,333 B2 | * | 1/2006 | Busch | 33/645 |
| 2006/0064888 A1 | * | 3/2006 | Chen | 33/365 |

\* cited by examiner

*Primary Examiner*—Christopher W Fulton
(74) *Attorney, Agent, or Firm*—Charles A. Wilkinson; Clinton H. Wilkinson

(57) ABSTRACT

A device and method for quickly and accurately leveling a surface in either the horizontal or vertical plane while not in proximity to the surface being leveled. The device comprises a rigid base designed to be places on any surface to be leveled, inclinometer circuitry used to determine the position of the rigid base relative to level or plumb, wireless circuitry used to transmit the results of the inclinometer to a remotely transportable unit containing a digital display used to read the results of the inclinometer reading.

12 Claims, 4 Drawing Sheets

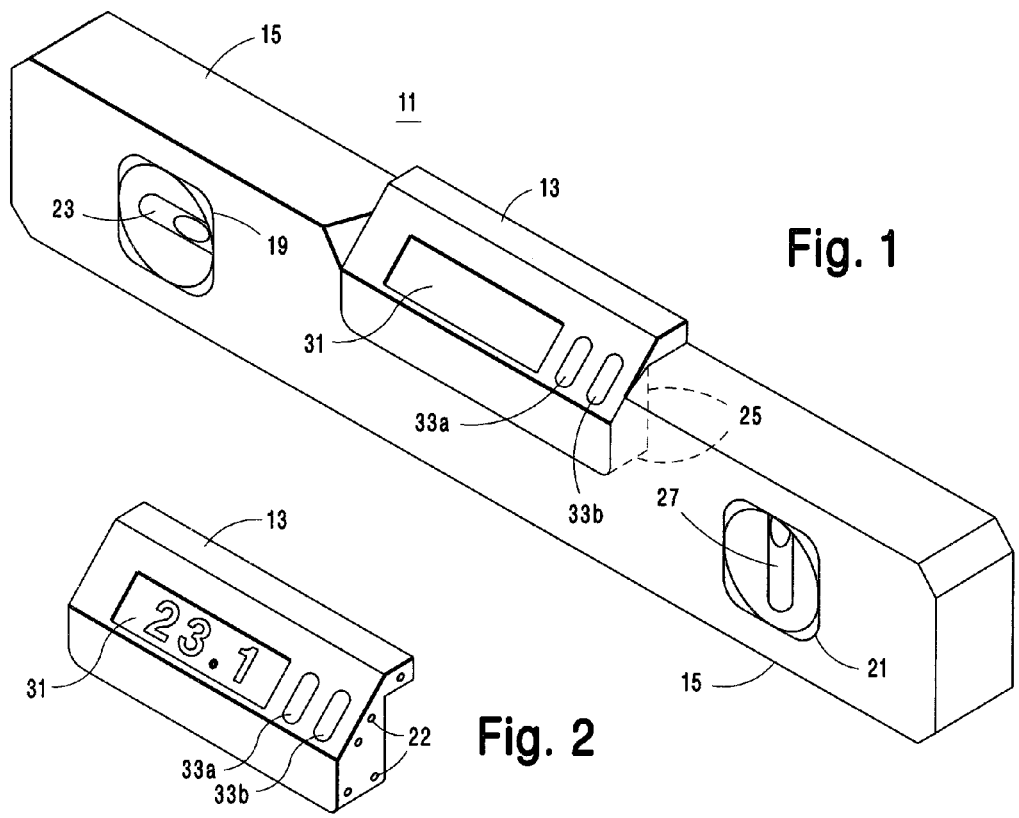
Fig. 1
Fig. 2
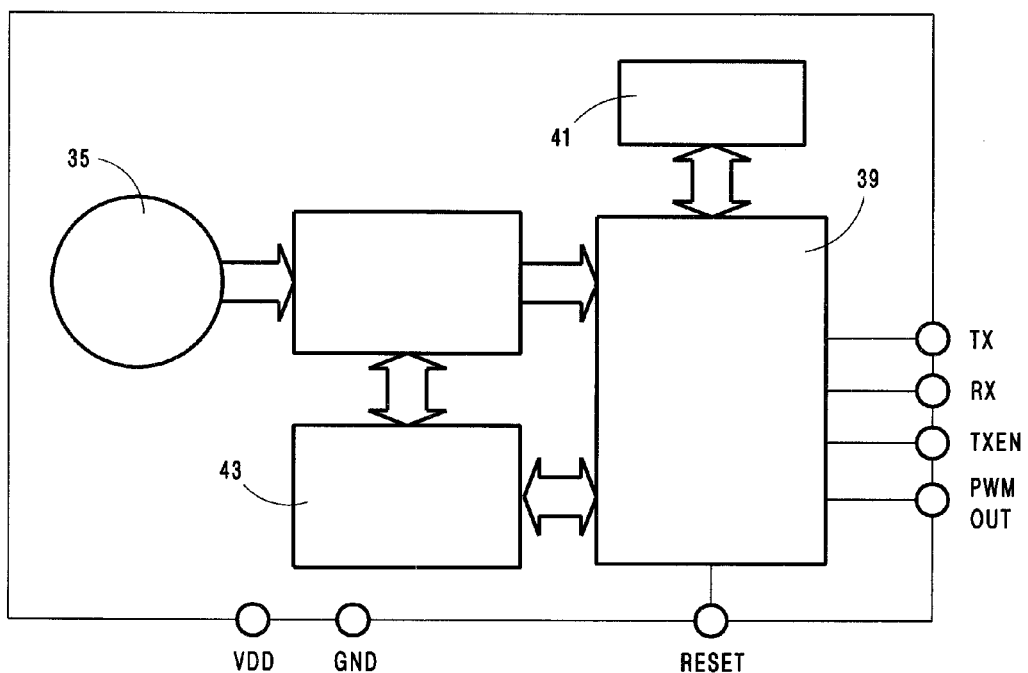
Fig. 3

DIGITAL LEVEL DETECTOR APPARATUS CONVERTIBLE FOR REMOTE SENSING

REFERENCE TO RELATED APPLICATION

This application claims priority from the U.S. provisional application 60/989,066 filed Nov. 19, 2007.

BACKGROUND OF THE INVENTION

1. Field of the Invention

This invention pertains broadly to tools for determining the special relation of objects to other objects and particularly to the earth including attitude or orientation and more particularly still to so-called leveling of objects with respect to each other or to the earth.

2. Preliminary Discussion

Tilt or inclination sensing devices have been known broadly for many years and for many purposes. Early types relied upon sight estimation of angle from the orientation of bubbles or floats in a clear liquid such as ethyl alcohol or other clear liquid contained in transparent tubes, initially gently curved glass tubes but later plastic tubes, which are less subject to breakage, and later by electrical signals transmitted through a conductive liquid such as mercury or the like normally confined in a tubular pathway.

The use of bubbles of air confined in a gently curved tube is frequently referred to as use of a so-called spirit level. Another early type of level detector depended upon the principle of a pendulum either visually monitored or electrically monitored. Gas bubble and pendulum type levels are generally lacking in sensitivity or readability, although the reliability of such instruments is fairly good when undamaged. Electrical or electronic detection or interpretation of the results from such instruments have resulted in better accuracy and reliability and have allowed remote sensing by digital or analog signals and readout. Air bubble capacitance can be made use of within electrically conducting liquids and battery powered units have been used for remote sensing of the inclination of ground level or the inclination of a vehicle such as an airplane or a spaceship with respect to both gravity and acceleration or deceleration. The flight level indicators used by aircraft make it possible to fly safely in bad weather when the level of a plane's wings with the horizon is otherwise undetectable and the direction of the earth easily confused by an aircraft pilot because of accelerative or centrifugal forces developed by the aircraft.

No previous tool for leveling having a completely detachable unit for resolving or sensing the inclination of a remote body so such body may be adjusted or leveled from a remote location is known to the present inventor, however. The present Applicant has therefore developed a level which can be used in the normal manner directly applied to a surface to detect inclination or which can alternatively be separated into two portions in electromagnetic or wireless communication with each other to detect the inclination of a remote surface and monitor it from a distance, or remotely. The usual arrangement will be to have the inclination detector placed upon the surface to be monitored and the receiver maintained with the worker or overall monitor. However, the invention also encompasses having a separable portion of the device be the inclination portion of the device or even to have both portions of the device, i.e. the detector and receiver separable from a main carrier in order to make the invention even more useful and adaptable to different or changing circumstances. Because of the fact that a larger leveling apparatus providing more extensive contact with the surface to be leveled or its inclination determined will usually provide more accurate results, other things being equal, it will usually be preferable to have the detector in a larger body and the receiver be contained in the separable body which takes a more compact size.

The present inventor is aware of the following prior patented art relating to inclinometers in general and more particularly, remote sensing inclinometers.

3. Description of Related Art

There have been a number of leveling or inclination devices developed through the years for indicating the level or inclination of a surface or structure or sometimes an opening or orifice in a structure from a distance when it is inconvenient, impossible, or sometimes dangerous for the one taking the measurement to be in the immediate viscidity of the level measurement apparatus or, rather frequently, to read the level instrument from. the position or angle available for such reading. Among such so-called remote reading instruments are the following.

Early U.S. Pat. No. 7,23,526 entitled "Leveling Staff" issued Mar. 24, 1903 to Hein, provided either the sound of a bell or the appearance of a light when a staff was properly aligned in an upright position for surveying purposes. The proper vertical alignment of such staff could therefore be determined from a distance.

U.S. Pat. No. 3,096,591 entitled "Radio Frequency Leveling Device" issued Jul. 9, 1963 to Higgins et al discloses the use of a capacitor circuit for detection of a bubble position in a spirit level thus converting the reading to a radio frequency signal suitable for remote signaling. The leveling device itself is not separable into a separate receiver and detector units, however.

U.S. Pat. No. 3,233,235 entitled "Signaling Level" issued Feb. 1, 1966 to G. Wright provided a leveling device operated electronically through a pendulum detection arrangement to detect the levelness of a surface upon which placed. A dial may be used to determine at what angle a reading may be signaled by an electrical signal providing an audible light or other signal so the results of the level operation can be detected from a distance allowing remote leveling at any given angle.

U.S. Pat. No. 3,324,564 entitled "Level with Electronically Responsive Instrument" issued Jun. 13, 1967 to Wright et al. discloses a level device which measures the change in reflectance of light from the bubble of a spirit level or in a light at the end of a pendulum reading the reflectance by dual capacitor plates and sending this signal through a circuit wire or cord to a meter unit connected to the detector enabling remote detection of leveling results.

U.S. Pat. No. 3,863,067 entitled "Orientation Indicating Apparatus" issued Jan. 28, 1975 to Gooley discloses an orientation detecting device using a bubble-type detector, the position of which bubble is detected electronically by reflected light and a signal, usually a light or auditory signal, issued for remote detection. It is mentioned in passing that such signals could be used to detect orientation at a distance remote from the detector, but no details are given, and a separate pod is not disclosed as being detectable from the main level casing for receiving a signal.

U.S. Pat. No. 4,154,000 entitled "Remote Level Sensing Instrument" issued May 15, 1979 to M. Kramer discloses means for improving the detection of a level surface by the application of electronic detection to a spirit level arrangement allowing remote detection and reporting of level or a particular inclined orientation. Various ways of increasing the accuracy of detection of the position of the bubble in a spirit level and using the results elsewhere are pointed out.

U.S. Pat. No. 4,467,527 entitled "Digital Read-Out Level" issued Aug. 28, 1984 to North et al. discloses a digital level unit that may be fitting into a carrier bar for remotely measuring angles and levelness of surfaces by the use of a level detector that may be removed and attached to different straight edge carriers for measuring surfaces. The level detector is based upon a weighted rotary member that is caused to rotate by the force of gravity by becoming aligned with the force of gravity and thereupon having its inclination with the straightedge carrier determined. The carrier is equipped with an automatic turn off switch to conserve battery power when the unit is laid aside.

U.S. Pat. No. 4,703,315 entitled "Level Indicating Device" issued Oct. 27, 1987 to Bein et al. discloses a leveling device, which is designed for remote indication of inclinations. The device is attachable to a main straightedge or the like and may include both an audible and visual signaling means to indicate a state of levelness or other angle at a distance or remote location.

U.S. Pat. No. 5,027,522 entitled "Electronic Level Indicator" issued Jul. 2, 1991 to Cagan et al. discloses an electronic level relying upon an electronic bridge circuit into which data from a bubble or spirit level or a pendulum level mechanism is fed, the resulting signal passes to a differential detector and ultimately to a suitable display. It is disclosed in passing that in order to provide low cost, the sensor may be constructed for replacement to allow easier replacement for repair, calibration, operational or production purposes. There is no intimation of having the leveling unit split into units for actual remote sensing of leveling or of removing certain elements for separate use in combination with the main unit.

U.S. Pat. No. 5,121,555 entitled "Proximity Differential Indicator for Aligning Machine Tools" issued Jun. 16, 1992 to Jiorle (the present inventor) discloses a device for quickly aligning a machine tool spindle to the work surface of the machine tool by use of paired inductive proximity sensors without touching the work piece.

U.S. Pat. No. 5,159,761 entitled "Electronic Level Indicator" issued Nov. 3, 1992 to Cagan et al. which is a continuation-in-part of the previous U.S. Patent to Cagan et al. adds a new FIG. 6 which illustrates the use of a level or inclination sensor having an additional bridge circuit for monitoring an additional level or inclination detector such that separate level or inclination data may be obtained in alternative directions. Such units may be directly plugged into or connected to the main unit and shown in separate readout units. The separate units are not separable from the main unit for detection, but only for multiplication of data or inclinations detected.

U.S. Pat. No. 6,836,972 entitled "Electronic Level with Audible and Visual Indicators" issued Jun. 4, 2005 to Drahos discloses a leveling device includable in a conventional spirit level or carpenter's level particularly for providing audible spoken transmission of the results obtained when in inaccessible or inconvenient places.

U.S. Pat. No. 7,154,406 entitled "Power Tool Level Indicator" issued Dec. 26, 2006 to Judge is designed for inclusion in the handle of an electric drill to indicate when in an equilibrium position.

U.S. Published Application 2007/0044334 to Leizerovich entitled "Wireless Device with Integrated Level" published Mar. 1, 2007 discloses broadly the combination of a handheld cell phone or the like combined with a level which two units are operated separately, i.e. either as a communication device or as a leveler. The two functions do not appear to be integrated together in operation.

No prior art known to the Applicant discloses the use of a level which can be used in a normal direct reading manner, but has a separable module that can be removed from the level detector itself and receives level data by wireless communication where more convenient than direct reading of such information.

OBJECTS OF THE INVENTION

It is an object of the invention to provide a inclinometer or level provided in a single tool base which can be used to detect and level a structure or portion of a structure from a remote location.

It is a further object of the invention to provide a level in which the level detector and/or the display of the level detector results, or readout, is removable from the principal level apparatus and the two portions are connected by signal means so that the level indication is transmitted essentially instantaneously to the detector portion of the apparatus for monitoring by the operator.

It is a further object of the invention to connect a digital inclination detector to a detachable receiver of such device by electric signal means.

It is a still further object of the invention to have the detector and a level detection receiver of the device connected to each other for passage of inclination or level signals by electromagnetic signal means to facilitate remote detached level detection.

It is a still further object of the invention to have the detectors for level conditions be an integral portion of the level device as a whole and the receiver for the detected information be separable for detection of the results at a remote location.

It is a still further object of the invention to have a level detection instrument as a whole equipped with a detachable receiver of inclination data and to have the inclination or level detection apparatus separable therefrom for remote operation upon an object or apparatus to be leveled or maintained level.

It is a still further object of the invention to have both a level detection unit and receiver of level information separable as need or fancy dictates from a principal apparatus.

It is a still further object of the invention to have a level detector equipped with remote level detection apparatus to be equipped with other direct level or inclination detector means for alternative use other than remote.

It is a still further object of the invention to provide a level-measuring device employing electronic level detection including a separable module that can be used for remote level detection by wireless communication.

It is a still further object of the invention to provide a method of leveling a remote object by means of separable detector and receiver and display devices communicating by digital radio signals.

Still other objects and advantages of the invention will become clear upon review of the following detailed description in conjunction with the appended drawings.

SUMMARY OF THE INVENTION

The invention provides a leveler tool for use by carpenters, construction workers and the like which it is not only very convenient to use, but easily convertible to various modes of use and provides very accurate results. The leveler uses digital technology to detect the inclination or levelness of an item against which it is brought into contact and may be read digitally in the normal manner on a display, or the display which is removable from the main detector, and may be read from a so-called remote location which may be more convenient, less hazardous or more conducive to accuracy than a location directly against the object being leveled.

BRIEF DESCRIPTION OF THE DRAWINGS

FIG. 1 is an isometric view of the leveling device of the invention in unitary use or storage mode.

FIG. 2 is an isometric view of the receiver and display unit of the leveling device removed from the main unit.

FIG. 3 is a basic block diagram of an inclinometer circuit suitable operation of the inclinometer of the invention.

DESCRIPTION OF THE PREFERRED EMBODIMENTS

Figure 4A:
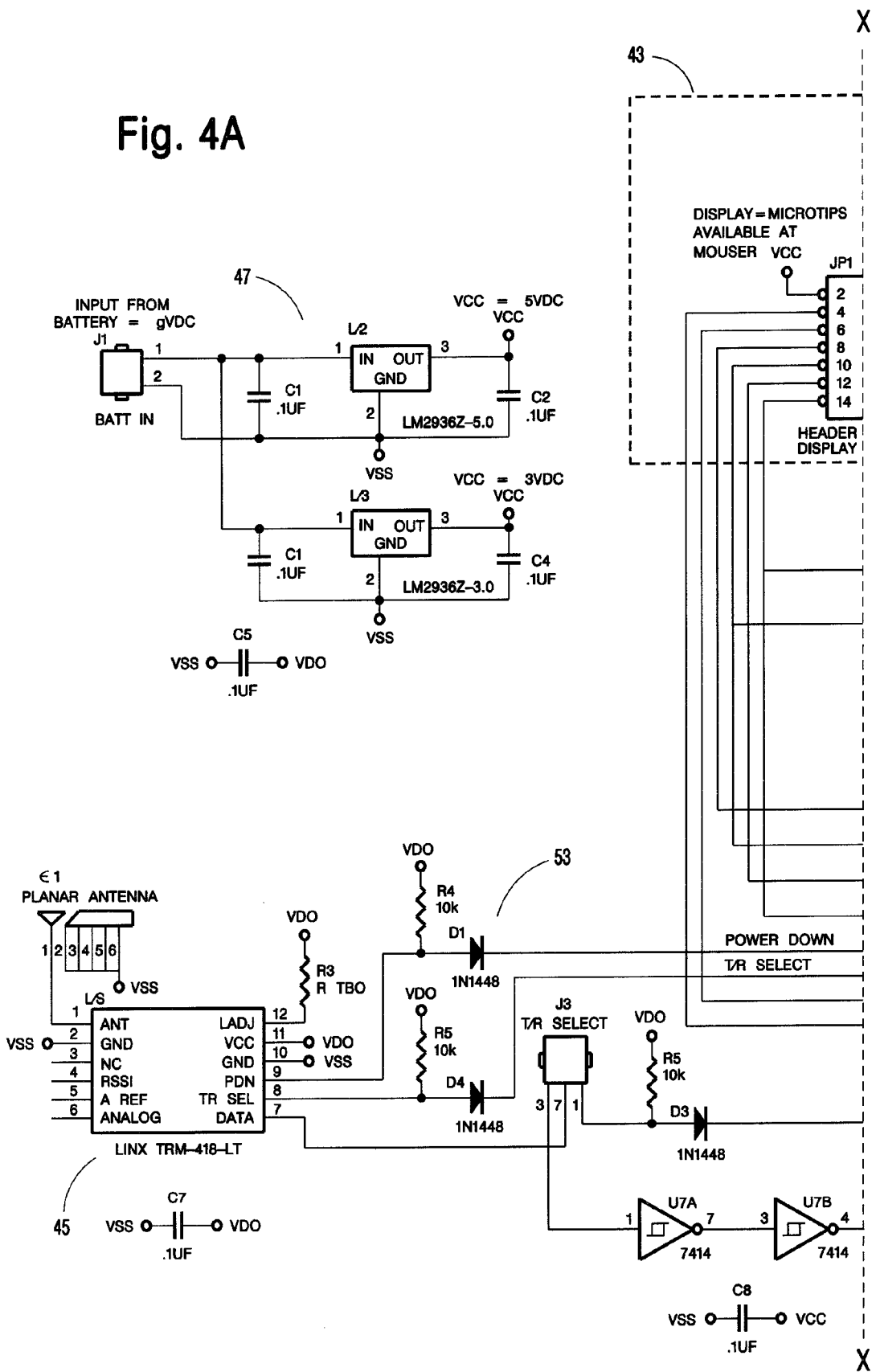
FIGS. 4A and 4B comprise two separate portions of a schematic diagram of a preferred arrangement of both the components of an inclinometer circuit board and a digital display circuit board combined together.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

There have been not only a large number of inventions in the leveling art, but a fair number of inventions or developments in the leveling art embodying elements to facilitate so-called remote leveling, by which it is meant that the user of the leveling apparatus can receive the results of such leveling operation from a position removed from the leveling detector. There are many instances where a leveling measurement is desired in which the one taking the measurement is essentially prevented by safety considerations, the space available, the light available or other serious considerations from directly attending the leveling instrument. For example, in a confined space between or under floors or in the space between drop ceilings direct access to obtain a measurement of level conditions or particular inclinations may be relatively or even completely restricted. For example, it may be necessary to level a motor for best operation in a restricted crawl space under a floor or it may frequently be necessary for one workman to perform a leveling operation relatively far from the position of the equipment or the like that is being leveled. Unless a remote leveling instrument is available in such circumstance it may be necessary for two workmen to be available to obtain the measurement, one to perform whatever operation is being conducted, which operation changes the level or attitude of a structure, and one to attend to the level measurement apparatus and relay the results to the other workman. In such circumstances, it is convenient if the measurement apparatus can be in one location, and the receipt of the results can be effected within the clear view of the person effecting the change, for example, the workman jacking up a sagging floor or the like. There have previously been such remote sensing leveling apparatuses. See for example, The Higgins et al. patent U.S. Pat. No. 3,096,591, and the Wright et al. patent U.S. Pat. No. 3,324,564 of the above-cited prior patents, which disclose specific apparatuses for remote leveling. To the knowledge of, and as the present Applicant is personally aware, however, such previous apparatus has been often inconvenient to use and not readily accessible to other types of leveling where the individual units are not readily applicable. Contrary to the case in previously known or available apparatus, the leveler of the present invention allows a workman to have a more or less standard level apparatus for normal use, which, however, incorporates a removable readout unit which will be in continuous close communication with a level detector in the leveling apparatus which transmits the leveling data results to the removable receiver unit wherever it may be and may be acted upon. For example, if a floor is being leveled by a below floor jacking operation, the receiver unit will be removed from the main level detection apparatus and kept with the person or party who is doing the leveling or erection below the floor level, while the level detection apparatus will be placed upon the top of the floor being erected and will keep constant contact with the receiver apparatus by wireless or electromagnetic communication so that the workman will or can know at all times exactly what the angle of the floor is and when it reads horizontal with respect to the environment or ninety degrees with respect to perpendicular and the workman will know what the reading is without having another party relay the results back to such workman. In most such cases it would not be well to have a second party riding the floor in any event, because the weight of the observer would disturb the floor and might provide a misleading communication of leveling data. Since digital electromagnetic communication is preferably used, the results reproduced usually in the exact angle detected will be very accurate and readable in very small increments without waiting for any damping out of variations in the results. The receiver, while completely separate operationally from the detection unit is physically secured to the main unit by any sort of easily detachable fastening arrangement or means such as a snap fit or the like so the receiver may not only be easily separated from the main unit when desired, but may be also easily reattached for example by snapping it back into place. There is no limitation upon the distances the units may be separated other than the possible fading of the signal with great distances caused by the progressive spreading out of the radio waves. However, since the receiver is not likely to be wished to be read at any great distance from the measuring or detection unit, the distance over which transmission can be effectively made is not likely to become an issue. While it is preferable for the readout of the angle detected to be read exactly in degrees of away from level, conventionally, for example, ninety degrees from vertical with minutes and seconds being the intermediate units, any other units of measurement can be used. The power for the communication energy will, of course, be conventionally provided by battery power in both the main detection unit and the receiver unit, with the availability of power being indicated by the lighting of an LED light either anytime during use or upon the operation of a preferably button type switch.

In FIG. 1 there is shown an oblique isometric view of an example of the invention taken from the upper right side in which there is shown the principal parts of an arrangement or example of the invention wherein there is illustrated a leveling unit or device usable either in the manner of a conventional level in which 11 is the main body of the leveling device having an elongated shape with a flat bottom 13 which is designed to be set directly upon a surface to be leveled or the levelness of which is to be determined compared with the center of the earth or straight down.

The base unit 15 is similar to the usual carpenter's level apparatus in that it has an elongated shape with a flat bottom preferably with two rails, not shown, embedded in the bottom which rails preferably project slightly from the bottom surface or alternatively are flush therewith and are absolutely level with each other. Alternatively, the bottom may be absolutely flat. Toward the ends of the base unit 15 are cut out sections 19 and 21 in which curved spirit level tubes 23 may be mounted in a conventional manner to provide a direct reading of the inclination status of the base unit 15 and thereby the inclination, if any, or level of the surface upon which it rests or, if held against the side of a structure, the inclination of such structure whether perpendicular to the earth or inclined at some angle indicated by gas bubbles in liquid in the tubing as known in the prior art. Alternatively, the spirit level tubes could be replaced by other level detection apparatuses such as conventional pendulum detectors or even by electronic detection apparatuses, but the relative inexpensiveness and reliability of the usual spirit level arrangement for direct viewing of inclination suggests that a spirit level arrangement be used for direct viewing of inclinations, the tube of such level being marked or calibrated to indicate inclination.

In the center of the level apparatus is an opening or pocket 25 the side of one end of which is indicated in broken lines designed to contain a removable electronic receiver unit 13 which can be removed from the main body of the detector and placed in any convenient location from which the operator may monitor the inclination or level of a structure. The receiver unit is provided with a suitable electromagnetic receiver circuitry by which to receive a broadcast of the inclination of the main body of the detector. Preferably adjacent to the rear of the pocket 25 in which the receiver 13 fits either when not being used or being used for direct reading of the inclination or level of an inclination is an electronic signal level detecting apparatus, not shown, which may be more accurate and sensitive than the spirit level readings. A circuit board 29 for such detection unit is provided. Such circuit board is mounted upon or within panel 29, which fits into a slot behind the electronic receiver unit 13 in the main level apparatus and is shown in more detail in FIG. 4. As shown in FIG. 5, a closely similar circuit board is built into the receiver circuit board which is mounted in the rear of the receiver unit 27, but is not shown as a separate circuit board, although the electronics are shown in FIG. 4 combined with the electronics for the electronics of the detection circuit.

The removable receiver 13 is preferably removably secured in its notch or opening in the rigid base unit by clips or snaps as known in the art. For example, spring bias ball snaps may be positioned in the opening in the base unit to snap into the matching depressions 22 shown in FIG. 2. One advantage of having the receiver 13 mounted only partially encompassed by the structure of the rigid base is that the receiver unit is thereby easier to grasp and extract for separate use in this manner.

In the presently preferred embodiment, the inclinometer circuit board is the type manufactured by Smart Tool Technologies as model 90104001 and is permanently affixed into a machined pocket in the rigid base 11. The circuit board contains all the necessary circuitry and components, such as an angle sensor which connects to a signal conditioner which then forwards the signal to a CPU/memory unit which then processes and forwards the signal to a transceiver, as illustrated in the block diagram in FIG. 3. These electronic components are designed to electronically establish the relative plane of the rigid base to the plane being measured and, with the addition of an integrated transceiver such as the type produced by Linx Technologies model TRM-315-LT, wirelessly transmitting the signals generated by the inclinometer circuitry to the removable display unit which also has a electronic circuit board containing another transceiver such as Linx model TRM-315-LT designed to receive and process the signals transmitted by the inclinometer circuitry and then displaying the results on either an analog panel meter or a liquid crystal display which is permanently mounted in the removable display unit.

In FIGS. 1 and 2 there is shown the detector plus receiver combination of the invention these are shown together in FIG. 1 and in FIG. 2, the receiver 13 is shown separated from the main body 15 of the level or detector. On the display 31 of the receiver in FIG. 2 there is shown a typical reading of a fairly sharp slant of whatever surface the main body of the leveler has been placed, i.e. 23 degrees and 1 minute a little less than forty-five degrees. The degrees of inclination or any other suitable indication of inclination or a lack thereof may be provided on any form of electronically operated visual display, power being obtained usually by a battery in the receiver circuit. Two adjacent rolls or adjustments 33a and 33b are provided for whatever adjustments to the reading may be desired.

FIG. 3 is an electronic functional block diagram of suitable inclinometer circuitry for signaling the inclination of the detector and therefore an object against which the detector has contact. This apparatus is a capacitive type detection circuit, but it will be understood that other suitable detection circuits could be used. Broadly speaking, a capacitor type detection is practiced at the capacitive circuit 35, which actually measures the angle of inclination at which the base unit 15 is set while the circuit is activated. This signal is fed to a conventional signal-conditioning unit and then to the central processing unit or CPU 39 equipped with a memory 41 and already provided with factory settings 43 all of which is conventional in the art. As will be understood the CPU may comprise a single processing chip.

Figure 4B:
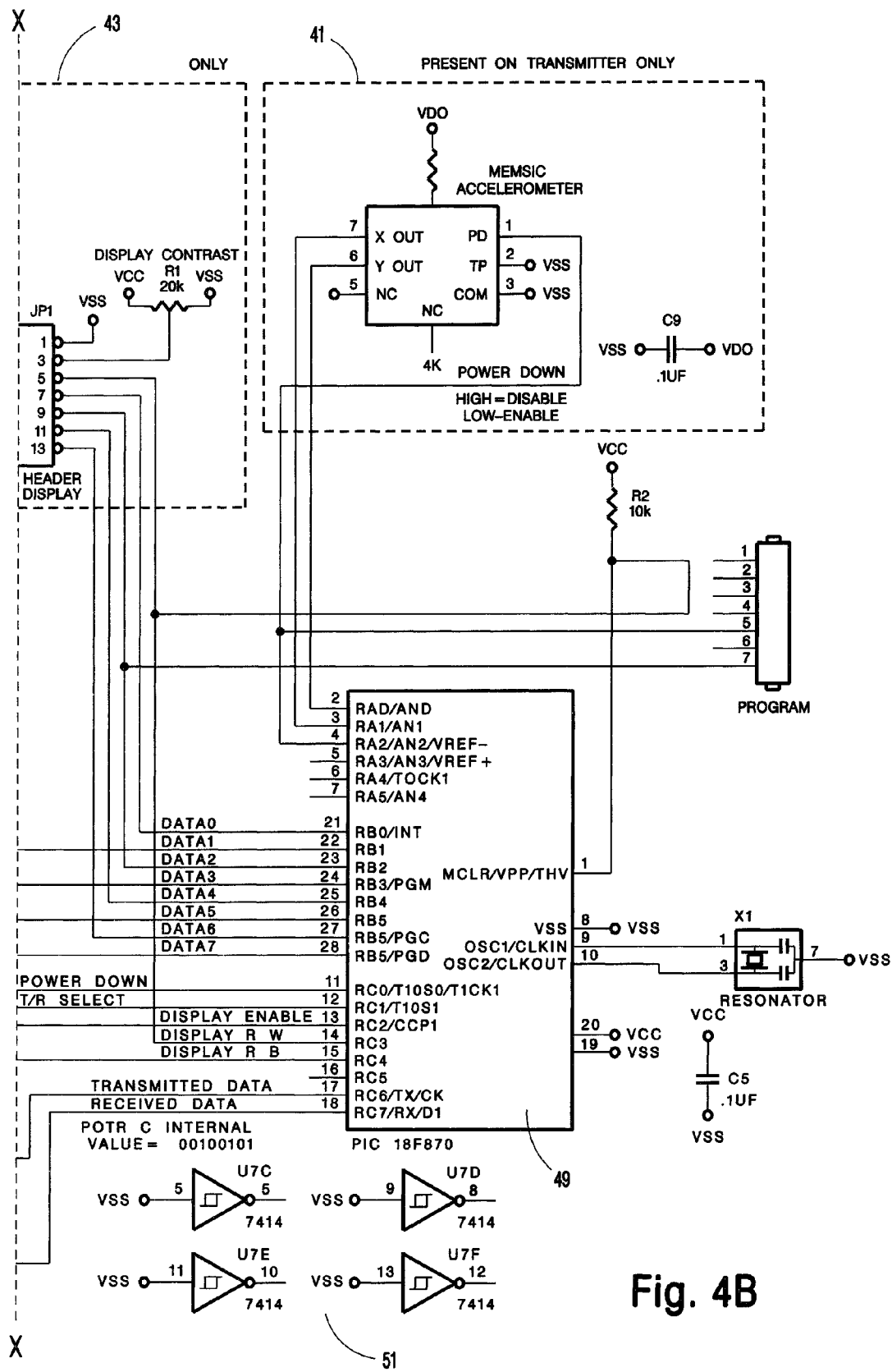
Figure 5:
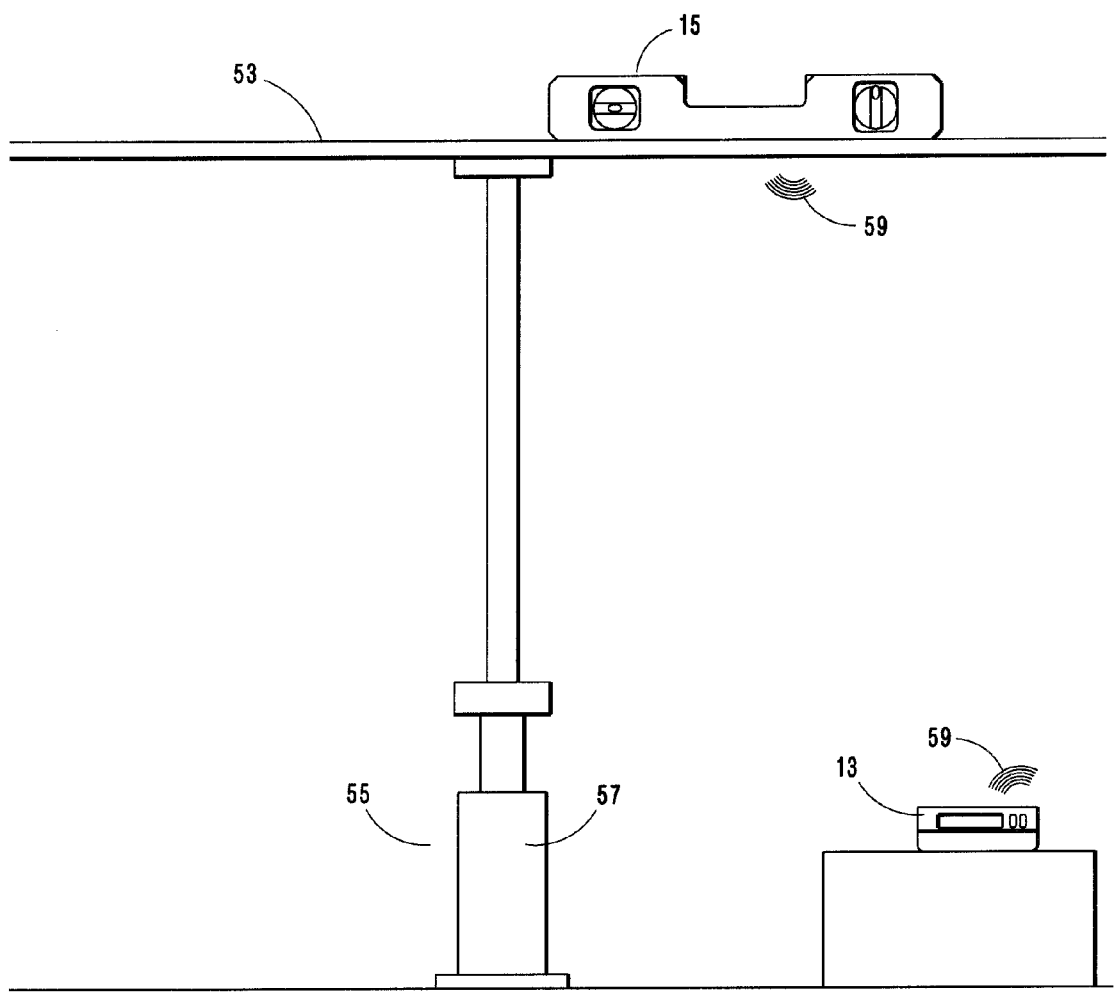
FIG. 5 is a side elevation of the level of the invention being used for the leveling of a floor with the level detector of the leveler placed upon an upper floor and the leveling receiver and display unit being placed close to the jack being used for jacking up the floor for reference as jacking proceeds.

FIGS. 4A and 4B are related portions of a circuit diagram of the wireless carpenter's level circuitry for the present invention. As explained, each wireless digital carpenter's level comprises a rigid base unit or main body unit as shown in FIGS. 1A and 2A and a removable wireless display unit seen in FIGS. 1B and 2B. Both the rigid base unit and the removable wireless display preferably use the same integrated circuit board design except that the rigid base unit will include on its circuit board an accelerometer circuit 41 whereas the removable wireless display or receiver circuitry is shown at 43. Both these units comprise usually appropriate microchips, but could comprise other apparatuses with similar functions. Other than for the accelerometer circuits 41 in the main base and the header display in the receiver apparatus, both of which are indicated as being individualized by being enclosed in dashed line boxes in FIG. 4, both the detection circuit and the receiver circuit are the same. The accelerometer circuit 41 may be of the type currently produced by MENISIC as model MXA6500M and may be permanently mounted and calibrated relative to the reference plane of the rigid base unit 15 and senses the relative position of the rigid base unit in either the X or Y axis and then outputs that information directly through the integrated circuitry to microcontroller 45 with an accurate timing signal as is common with this type of digital control or circuit.

The header display 43 may be of the type produced by Microtips, model NMTC-S0802X RGHS and is wired or connected directly to the microcontroller 45 and provides the circuitry to mount a digital display unit which will be housed within the removable wireless display unit or receiver 13.

A voltage regulator 47 is used in the circuit to regulate the required voltage for operations of each of the circuits. A battery producing 9 volts is used in both the rigid base unit or main body unit 11 and the removable wireless display or receiver 13, and is regulated to an operating voltage of about five (5) volts for the header display 43 and about three (3)

volts for both the accelerometer 41 and transceiver circuitry 47. Such operating voltage is activated by the use of an on/off switch permanently mounted in both the rigid base unit 15 and removable wireless display or receiver 13.

The transceiver 45 is of the type produced by LINX as model TRM-418-LT and is wired directly to microcontroller 49 and is regulated by switching diodes 49. The signals generated by accelerometer 41 which are then processed by the microcontroller 49 are sent directly as data to transceiver 45 mounted in the rigid base unit 15 through the antenna and wirelessly transmitted to the removable wireless display or receiver which then in turn sends the data generated by the accelerometer 41 directly to the microcontroller 45 which then in turn sends the processed data directly to the header display 43 to be generated on the graphical display unit 31.

Several trigger inverters 51 of a type produced by Her-Schmitt are used to condition the signals generated by the microcontroller 21 by providing greater stability and minimize hysteresis.

In FIG. 5 there is shown an example of the use of the invention in which the base unit 15 of the apparatus has been placed upon the surface of a floor 53 which is being lifted or repositioned by a hydraulic jack 55 which is being operated by pumping the handle 57. Meanwhile the separate receiver section 13 of the combined detector and receiver has been withdrawn from storage and part time operating or receiving position and has been placed on a box or other surface adjacent the operator of the jack, not shown. The base leveler unit 15 and the receiver 13 are as shown in operating radio communication with each other as indicated by the wave disturbance indicators 59 adjacent each unit so that the operator, not shown, may be advised continuously of the level in degrees or other chosen units of the lateral disposition of the floor without being adjusted. For simplicity, the floor which would in all likelihood be provided with joists or the like to actually support the thin floor are not shown. The principal, however, will be readily appreciated.

Traditional carpenter levels, comprising that of prior art, have been effective at what they are designed to do, however, there are many times when a craftsperson finds it necessary to place a leveling device at a location which is distant from where the craftsperson must make the necessary adjustments to the surface being leveled. The digital carpenter's level with a removable wireless display of the present invention addresses these shortcomings by allowing a craftsperson to quickly and accurately adjust any surface requiring it be level or plumb while not in proximity to the rigid base and accomplish this task without the aid of a second individual who would, traditionally, be required to read and audibly, or by other means, relay the leveling results of the prior art device to the craftsperson making the necessary leveling adjustments.

While the present invention has been described in terms of specific embodiments, it is to be understood that the invention is not necessarily limited to these disclosed embodiments. This invention may therefore be embodied in different forms and should not be construed as limited to the embodiments set forth herein, rather, such embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings and the claims.

Consequently, while the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A device for leveling surfaces at a variety of possible angles, while not in proximity to the surface being leveled using digital wireless circuitry to transmit and display the measurements on a remote display unit, comprising:
    (a) a rigid base adapted for mounting the device to a surface,
    (b) an inclinometer housed within the rigid base,
    (c) a transceiver housed within the rigid base,
    (d) a removable display unit adapted to be housed at least partially within the rigid base,
    (e) a transceiver housed within the removable display unit,
    (f) a digital signal processor housed within the removable display unit,
    (g) whereby the removable display unit may be removed from the rigid base for use in a remote leveling operation.

2. The device of claim 1 wherein said rigid base includes at least one direct visual readable inclinometer detection elements.

3. The device of claim 2 wherein the direct readable inclinometer device comprises a spirit level.

4. The device of claim 2 wherein the signal generated by the inclinometer is wirelessly transmitted to the removable display unit.

5. The device of claim 4 wherein the signal generated by the inclinometer is received and processed by the removable display unit transceiver.

6. The device of claim 5 wherein the processed signal is visually displayed.

7. The device of claim 1 wherein part of the rigid base forms a pocket to accept a removable display unit.

8. The device of claim 1 wherein the removable display unit and rigid base contain broadly similar reciprocal circuits.

9. The device of claim 1 wherein the removable display unit comprises a liquid crystal display.

10. A method of leveling objects using a remote leveling apparatus separable into separate detection and receiving and display units comprising:
    (a) detaching a digital receiver and display unit from a rigid base unit including an integral level detector apparatus and radio frequency broadcasting circuit,
    (b) placing the rigid base unit on contact with a body, the attitude of which it is wished to determine,
    (c) retaining the receiving unit at a location in which the one wishing to obtain level information wishes to receive such information, and
    (d) visually display at least the angle of the surface upon which the rigid base unit assumes.

11. A method of leveling in accordance with claim 10 in which the leveling information is transmitted between units in digital radio wave form.

12. A method of leveling objects using a remote leveling apparatus separable into separate detection and receiving and display units comprising:
    (a) maintaining the separable units together while leveling,
    (b) communication being by digital radio communication.

\* \* \* \* \*